United States Patent
Osaki et al.

(10) Patent No.: US 9,084,988 B2
(45) Date of Patent: Jul. 21, 2015

(54) NO$_X$ PURIFICATION CATALYST

(71) Applicant: TOYOTA JIDOSHA KABUSHIKI KAISHA, Aichi-ken (JP)

(72) Inventors: Mayuko Osaki, Susono (JP); Hirohito Hirata, Sunto-gun (JP); Naoyuki Hara, Nishikamo-gun (JP); Brian Johnson, Cambridge (GB); Andrew Wheatley, Cambridge (GB); Helen Skelton, Slip End (GB); Muriel Lepage, Zaventem (BE)

(73) Assignees: TOYOTA JIDOSHA KABUSHIKI KAISHA, Aichi-ken (JP); CAMBRIDGE ENTERPRISE LIMITED, Cambridgeshire (GB)

( * ) Notice: Subject to any disclaimer, the term of this patent is extended or adjusted under 35 U.S.C. 154(b) by 0 days.

(21) Appl. No.: 14/209,164

(22) Filed: Mar. 13, 2014

(65) Prior Publication Data
US 2014/0194280 A1 Jul. 10, 2014

Related U.S. Application Data

(63) Continuation of application No. 13/983,698, filed as application No. PCT/JP2011/052974 on Feb. 7, 2011, now abandoned.

(51) Int. Cl.
*B01J 23/02* (2006.01)
*B01J 23/58* (2006.01)
*B01J 23/70* (2006.01)
*B01J 23/74* (2006.01)
(Continued)

(52) U.S. Cl.
CPC .................. *B01J 23/8906* (2013.01)

(58) Field of Classification Search
CPC ...... B01J 23/52; B01J 23/745; B01J 23/8906; B01J 35/02
USPC .......... 502/330, 336, 338, 344, 439
See application file for complete search history.

(56) References Cited

U.S. PATENT DOCUMENTS 7,829,140 B1 * 11/2010 Zhong et al. .................. 427/212
2005/0095189 A1  5/2005 Brey et al.
(Continued)

FOREIGN PATENT DOCUMENTS

| CN | 1901992 A | 1/2007 |
| JP | 04-281846 A | 10/1992 |
| JP | 08-257403 A | 10/1996 |

(Continued)

OTHER PUBLICATIONS

A. Naitabdi et al., "Formation, thermal stability, and surface composition of size-selected AuFe nanoparticles", Applied Physics Letters, 2007, pp. 113110-1-113110-3, vol. 91.
(Continued)

*Primary Examiner* — Cam N Nguyen
(74) *Attorney, Agent, or Firm* — Sughrue Mion, PLLC

(57) ABSTRACT

The present invention relates to a catalyst able to exhibit an NO$_x$ purification performance at a low temperature and/or in an oxidizing atmosphere, that is, a nitrogen oxides purification catalyst composed of particles having an average particle size of 0.2 to 100 nm and including gold atoms and iron atoms in a state of close proximity.

6 Claims, 11 Drawing Sheets

(51) Int. Cl.
  *B01J 21/04*   (2006.01)
  *B01J 23/89*   (2006.01)

(56) References Cited

U.S. PATENT DOCUMENTS

2006/0210864 A1  9/2006  Eguchi et al.
2009/0117447 A1  5/2009  Brace et al.

FOREIGN PATENT DOCUMENTS

| JP | 10-216518 A | 8/1998 |
|---|---|---|
| JP | 2001-104728 A | 4/2001 |
| JP | 2001-239161 A | 9/2001 |
| JP | 2003-190787 A | 7/2003 |
| JP | 2008-279439 A | 11/2008 |

OTHER PUBLICATIONS

Naween Dahal et al., "Synthesis of Water-Soluble Iron-Gold Allow Nanoparticles", Cehm. Mater., 2008, pp. 6389-6395, vol. 20.

A. Naitabdi et al., "Thermal Stability and Segregation Processes in Self-Assembled Size-Selected AuxFe1-x Nanoparticles Deposited on TiO2(110): Composition Effects", J. Phys. Chem. C, 2009, pp. 1433-1446, vol. 113.

* cited by examiner

$NO_x$ PURIFICATION CATALYST

This is a Continuation of application Ser. No. 13/983,698 filed Aug. 5, 2013, which is the National Stage of PCT/JP2011/052974 filed Feb. 7, 2011, the entire disclosure of the prior applications, application Ser. No. 13/983,698 and PCT/JP2011/052974 are hereby incorporated by reference.

BACKGROUND OF THE INVENTION

1. Field of the Invention

The present invention relates to a nitrogen oxide (and more, sometimes abbreviated as "$NO_x$") purification catalyst, more particularly relates to a novel $NO_x$ purification catalyst comprised of particles including gold atoms and iron atoms and able to purify $NO_x$ at a low temperature and/or in an oxidizing atmosphere.

2. Description of the Related Art

In recent years, from the viewpoint of protection of the global environment, exhaust gas regulations have been toughened around the world with each passing year. As one means for dealing with this, in internal combustion engines, exhaust gas purification catalysts are being used. In such exhaust gas purification catalysts, in order to efficiently remove HC (hydrocarbons), carbon monoxide (CO), and $NO_x$ in the exhaust gas, platinum, gold, rhodium, and other precious metals have been used as catalyst ingredients.

In motor vehicles using such purification catalysts, for example gasoline engine vehicles and diesel engine vehicles, various systems are being used to improve the catalytic activity and the fuel economy. For example, for improving fuel economy during steady state operation fuel is burned under conditions of a lean (excess oxygen) air-fuel ratio (A/F), while to improve the catalytic activity, fuel is burned under temporarily stoichiometric (stoichiometric air-fuel ratio, A/F=14.7) to rich (excess fuel) conditions.

These conditions apply because conventionally known platinum, gold, rhodium, and other precious metal catalysts exhibit low $NO_x$ purification performances at low temperature and under oxidizing conditions. To improve the purification performance, the purification catalyst has to be operated high in temperature and HC or CO etc. has presently to be added to establish a reducing atmosphere. Therefore, even during steady state operation, it is not possible to increase the air-fuel ratio (A/F).

With the above precious metal catalysts, there is therefore a limit to the improvement of the fuel economy. In such conventionally known precious metal catalysts, to obtain purification performance, energy for raising the purification catalysts to a high temperature, fuel for temporarily exposing the purification catalysts to a reducing atmosphere, and reduction of the air-fuel ratio (A/F) in the engine are all required. To improve the fuel economy in automobile engines and other internal combustion engines, therefore, a new purification catalyst able to exhibit a good $NO_x$ purification performance at a low temperature and/or in an oxidizing atmosphere is being sought.

Furthermore, all of the above precious metal catalysts face the problem of resource depletion. $NO_x$ purification catalysts using other metals to obtain purification performances equal to or better than those of conventional precious metal catalysts or able to reduce the amounts of the precious metals used are therefore being sought.

For example, Japanese Patent Publication (A) No. 10-216518 describes a gold alloy catalyst comprised of gold and one or more metals (M) selected from platinum, palladium, silver, copper, and nickel, having a weight ratio Au/M of 1/9 to 9/1, and having an amount of solute gold in the alloy of 20 to 80 wt %. Further, the catalysts shown as specific examples in this publication are catalysts supporting a gold alloy of gold and a metal of palladium or platinum on an $Al_2O_3$ carrier. These exhibit a high $NO_x$ purification performance in a reducing atmosphere, but have a low $NO_x$ purification performance at a low temperature and/or in an oxidizing atmosphere.

Further, Japanese Patent Publication (A) No. 10-216519 describes a metal particulate-carrying oxide catalyst produced by heat treating a metal compound composed of one or more elements selected from gold, platinum, palladium, rhodium, silver, iridium, ruthenium, and osmium and one or more elements selected from metals of strontium, niobium, lithium, lanthanum, aluminum, silicon, magnesium, calcium, barium, cerium, neodymium, titanium, iron, cobalt, nickel, copper, zinc, zirconium, vanadium, tantalum, chromium, molybdenum, tungsten, sodium, potassium, beryllium, scandium, yttrium, indium, tin, lead, and bismuth in an atmosphere containing oxygen. Further, the catalysts shown as specific examples in this publication are catalysts composed of gold alloy incorporating strontium or lanthanum on an $Al_2O_3$ carrier. They exhibit a relatively high $NO_x$ purification performance in a reducing atmosphere, but have an extremely low $NO_x$ purification performance at a low temperature and/or in an oxidizing atmosphere.

Further, Japanese Patent Publication (A) No. 2001-239161 describes a low temperature harmful gas-purification catalyst comprised of a metal oxide on carbonaceous material carrier using high temperature/high pressure fluid to carry ultrafine particles of at least one type of metal selected from the group comprising platinum, palladium, rhodium, ruthenium, iridium, osmium, gold, silver, copper, manganese, iron, and nickel. Further, the catalysts shown as specific examples in this publication are purification catalysts supporting one of type of platinum, palladium, rhodium, ruthenium, nickel, or gold. They exhibit a good $NO_x$ purification performance in a reducing atmosphere.

Furthermore, Japanese Patent Publication (A) No. 2003-190787 describes an engine exhaust gas purification catalyst mainly comprised of $12CaO.7Al_2O_3$ and carrying one or more elements selected from gold, silver, iron, zinc, manganese, cerium, and platinum group elements. Further, this publication shows, as specific examples, that purification catalysts mainly comprised of $12CaO.7Al_2O_3$ carrying one element out of gold, silver, platinum, palladium, copper, iron, zinc, manganese, cerium, or rhodium or two elements out of silver and rhodium, ruthenium, or copper fired at 600° C. exhibit the effect of reducing the combustion temperature by the oxidation reaction of the particulate matter (PM) by oxygen radicals. However, this publication does not prescribe the positional relationship of the two types of metals. It is unclear if the catalysts shown as specific examples in this publication exhibit an $NO_x$ purification performance.

As related art, therefore, there are the above Japanese Patent Publication (A) No. 10-216518, Japanese Patent Publication (A) No. 10-216519, Japanese Patent Publication (A) No. 2001-239161, and Japanese Patent Publication (A) No. 2003-190787.

SUMMARY OF THE INVENTION

Therefore, in these known purification catalysts, it was difficult to reduce the amounts of precious metals used and obtain good $NO_x$ purification performance at a low temperature and/or in an oxidizing atmosphere.

Therefore, an object of the present invention is to provide a catalyst able to reduce the amount of use of precious metal whilst exhibiting a good $NO_x$ purification performance at a low temperature and/or in an oxidizing atmosphere.

The inventors engaged in intensive research for the purpose of realizing the above object and as a result have completed the present invention.

The present invention provides a nitrogen oxide purification catalyst comprised of particles having an average particle size of 0.2 to 100 nm and including gold atoms and iron atoms in a state of close proximity. The "average particle size" in the present invention is the average of the particle sizes measured using a method explained in detail later in the section on examples.

According to the present invention, it is possible to obtain a catalyst that uses less precious metal and exhibits a good $NO_x$ purification performance at a low temperature and/or in an oxidizing atmosphere.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1A:
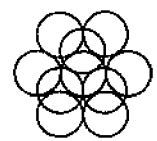
FIG. 1A is a model of a nanoparticle in an $NO_x$ purification catalyst of an embodiment of the present invention.

The $NO_x$ purification catalyst of the present invention has to include gold atoms and iron atoms in a state of close proximity in particles.

The expression "gold atoms and iron atoms in a state of close proximity in particles" means a state in which at least one of the gold atoms is contiguous with at least one of the iron atoms in primary particles that are nanoparticles.

Below, referring to the drawings, embodiments of the present invention will be explained in detail.

Figure 1B:
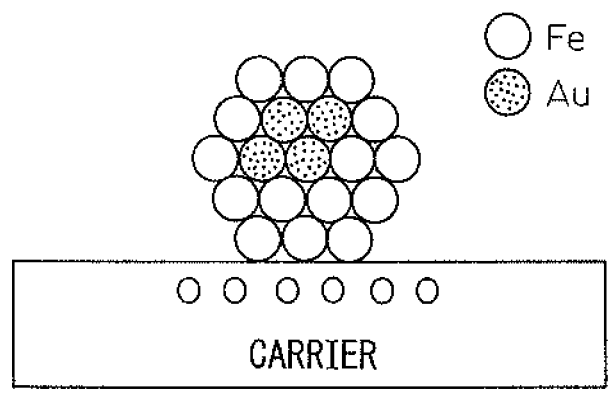
FIG. 1B is a schematic view of an $NO_x$ purification catalyst of an embodiment of the present invention.

The $NO_x$ purification catalyst of the present invention, as shown in FIG. 1A, envisions, an ideal spherical particle cut between out from nearby atoms of a cut out of a face-centered cubic lattice (cuboctahedron structure). As shown in FIG. 1B, the catalysts can be understood as a support on which is supported Au—Fe bimetal nanoparticulates when assuming at least one gold atom covered by iron atoms at the surface first layer and second layer carrier side half surfaces. In this model, the iron atoms at the surfacemost part of the particulate are set to be in close proximity to the gold atoms. Further, the model shown in FIG. 1B assumes iron covers the surface first layer and second layer of carrier side surface by virtue of presence of the oxidizing gas and the interaction with the carrier oxygen. We justify this assumption on the basis that iron has a larger bonding force with oxygen compared with gold in an oxidizing atmosphere. Iron therefore more easily appears at the nanoparticle and also easily bonds with the carrier, which also contains oxygen.

Figure 2A:
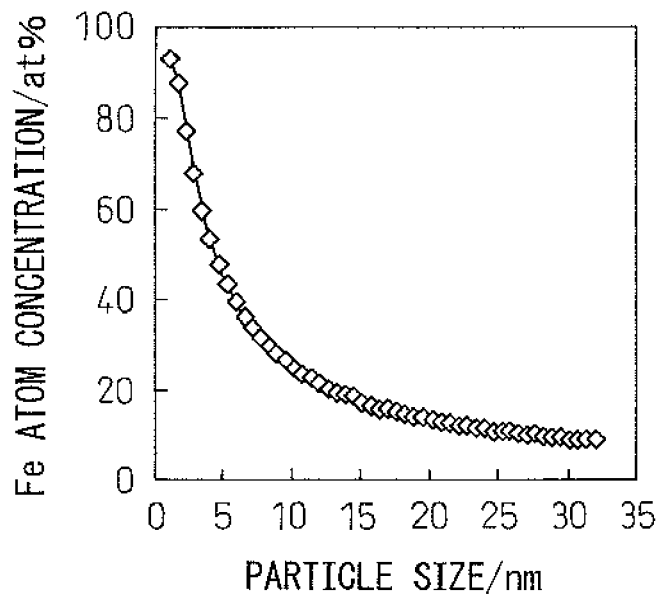
FIG. 2A is a graph showing the relationship between the iron concentration and particle size in the model shown in FIG. 1A.
Figure 2B:
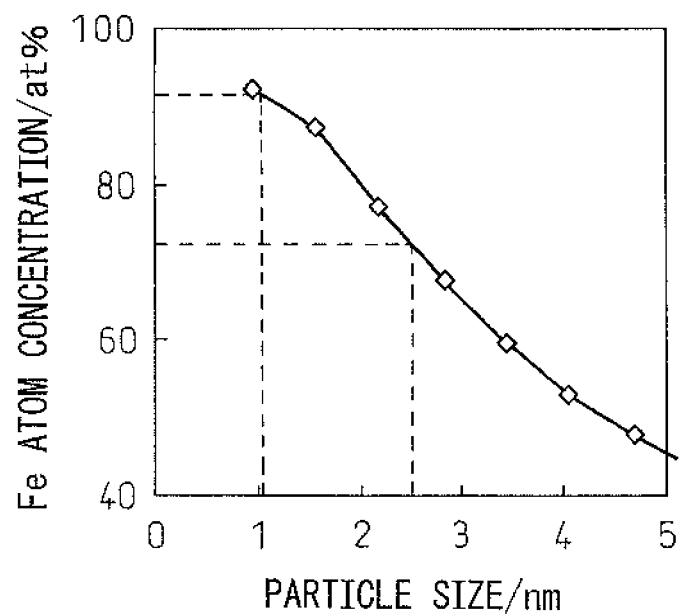
FIG. 2B is a graph enlarging part of FIG. 2A.

According to this model, it is understood that the $NO_x$ purification catalyst that constitutes the present invention, as shown in FIG. 2A, can exist as metal nanoparticles having a particle size of 0.2 to 30 nm with a range of concentration of Au:Fe=7:93 to 91:9 (at %) and, from FIG. 2B, can have metal nanoparticles of a range of concentrations of Au:Fe=8:92 to 26:74 (at %) and, in this matter, a mean particle size of for example about 0.9 to 2.5 nm.

Figure 3A:
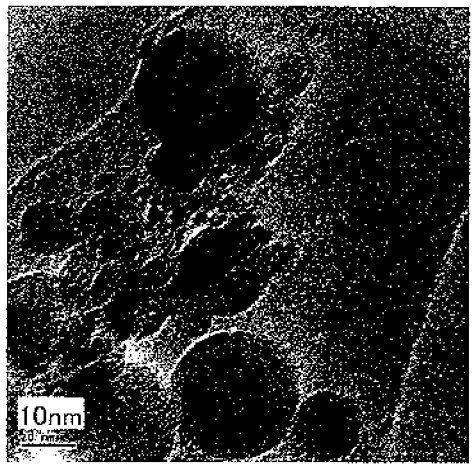
FIG. 3A is a TEM image of nanoparticles of AuFe (Au:Fe=50:50, atomic ratio, same below) of an AuFe/$Al_2O_3$-based $NO_x$ purification catalyst obtained in an example of the invention.
Figure 3B:
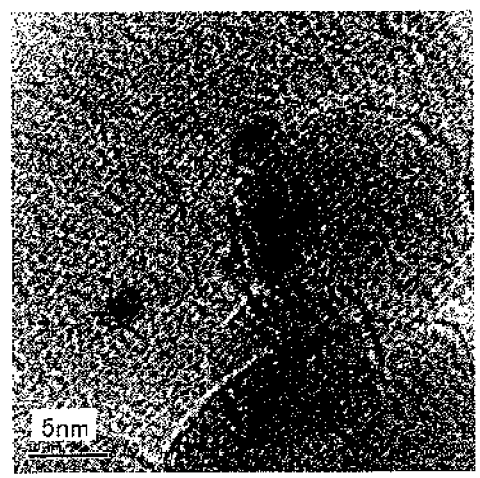
FIG. 3B is a TEM image changing the scale of FIG. 3A.

Referring to FIG. 3A and FIG. 3B, the AuFe (Au:Fe=50:50)/$Al_2O_3$-based $NO_x$ purification catalyst of the examples discussed is composed of nanoparticles of AuFe particles having a particle size of 4.97±0.75 nm.

Figure 6:
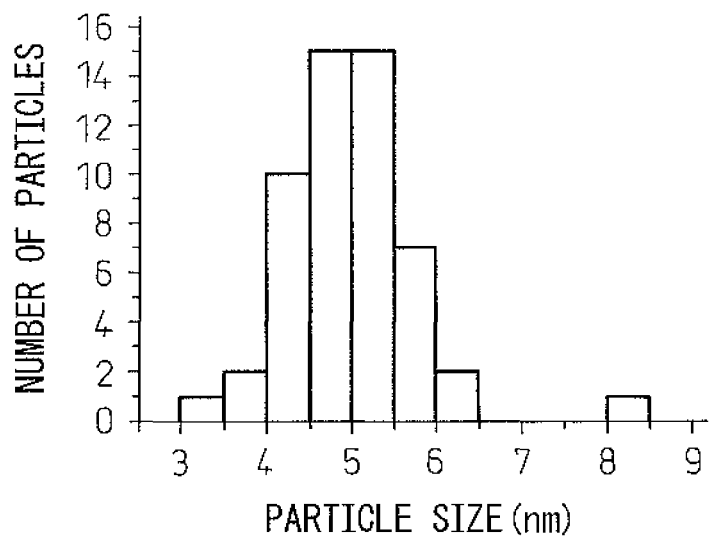
FIG. 6 is a histogram showing the particle size distribution of 100 nanoparticles in an HRTEM image obtained for nanoparticles of AuFe (Au:Fe=50:50) of an AuFe/$Al_2O_3$-based $NO_x$ purification catalyst obtained in an example of the invention.

Referring to FIG. 6, this AuFe (Au:Fe=50:50)/$Al_2O_3$-based $NO_x$ purification catalyst has a particle size distribution, found for 100 particles in an HRTEM image, of 3 to 6.5 nm in range.

Figure 8:
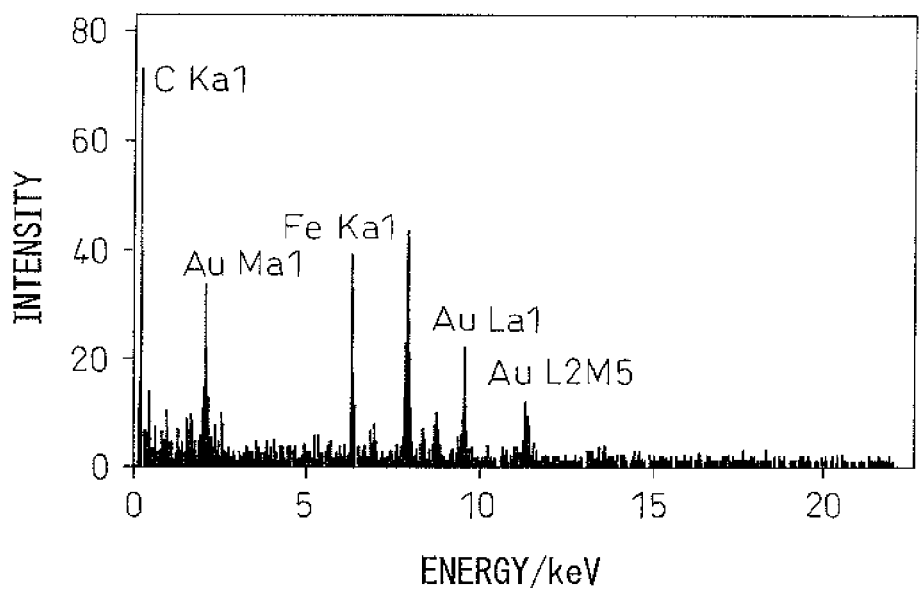
FIG. 8 is a TEM-EDS spectrum of AuFe (Au:Fe=50:50) nanoparticles of an AuFe/$Al_2O_3$-based $NO_x$ purification catalyst obtained in an example of the invention.

Referring to FIG. 8, it is shown that the particles of the $NO_x$ purification catalyst (Au:Fe=50:50) include both the ingredients of gold and iron from the TEM-EDS spectrum.

Figure 12:
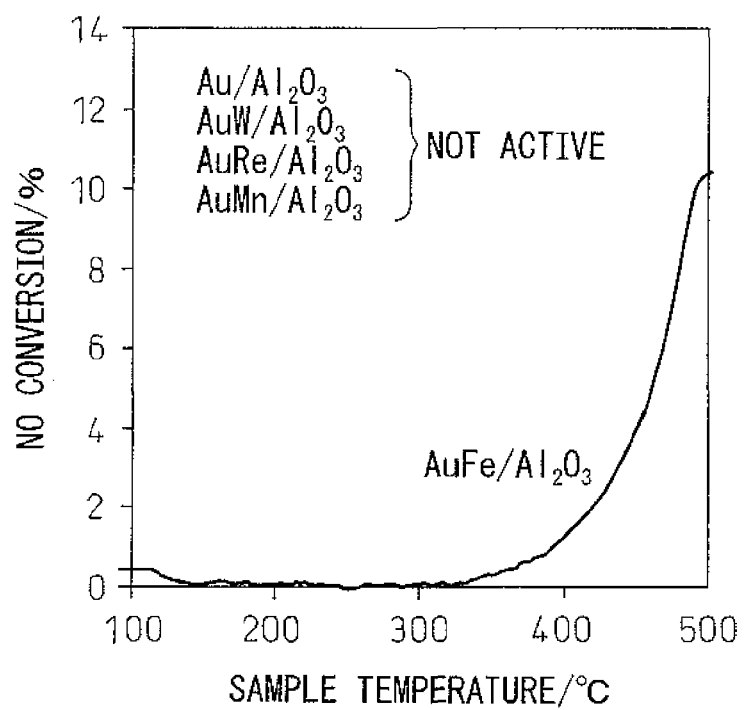
FIG. 12 is a graph comparing the NO—CO catalytic activity of an AuFe (Au:Fe=50:50)/$Al_2O_3$-based $NO_x$ purification catalyst obtained in an example of the invention and $NO_x$ purification catalysts outside the range of the present invention.

Further, from FIG. 12, it can be seen that among $NO_x$ purification catalysts having $Al_2O_3$ as a carrier, the AuFe-based $NO_x$ purification catalysts that constitute the present invention all exhibit distinctive NO—CO catalytic activities as compared to Au-, AuW-, AuRe-, and AuMn-based $NO_x$ purification catalysts—all of which had NO conversion rates at 500° C. of 0%.

Referring to FIG. 4A, FIG. 4B, FIG. 4C, and FIG. 4D, the AuFe (Au:Fe=50:50)/$SiO_2$-based $NO_x$ purification catalysts that represent examples of the present invention are composed of nanoparticles of AuFe with a mean particle size of 3.94±0.56 nm or 4.72±0.77 nm.

Figure 7:
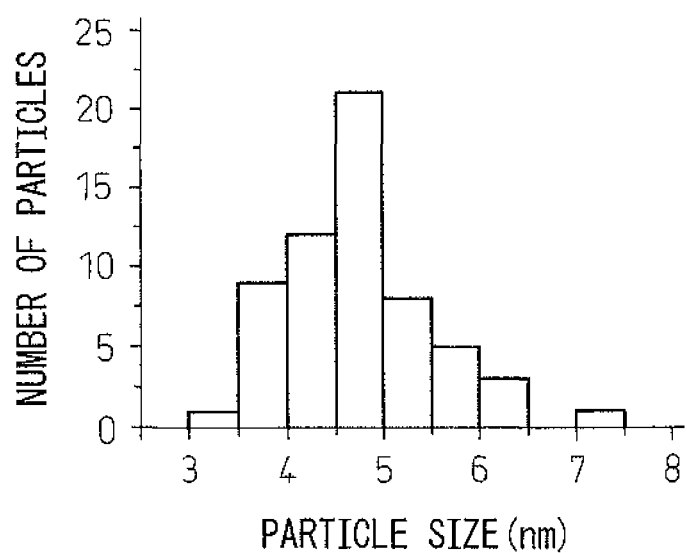
FIG. 7 is a distribution histogram of the particle size showing the particle size distribution of 100 nanoparticles in an HRTEM image obtained for nanoparticles of AuFe (Au:Fe=50:50) of an AuFe/$SiO_2$-based $NO_x$ purification catalyst obtained in another example of the invention.

Referring to FIG. 7, it is shown that the particle size distribution found for 100 particles in multiple HRTEM images of with AuFe (Au:Fe=50:50)/$Al_2O_3$-based $NO_x$ purification catalyst was 3 to 7.5 nm in range.

Figure 9:
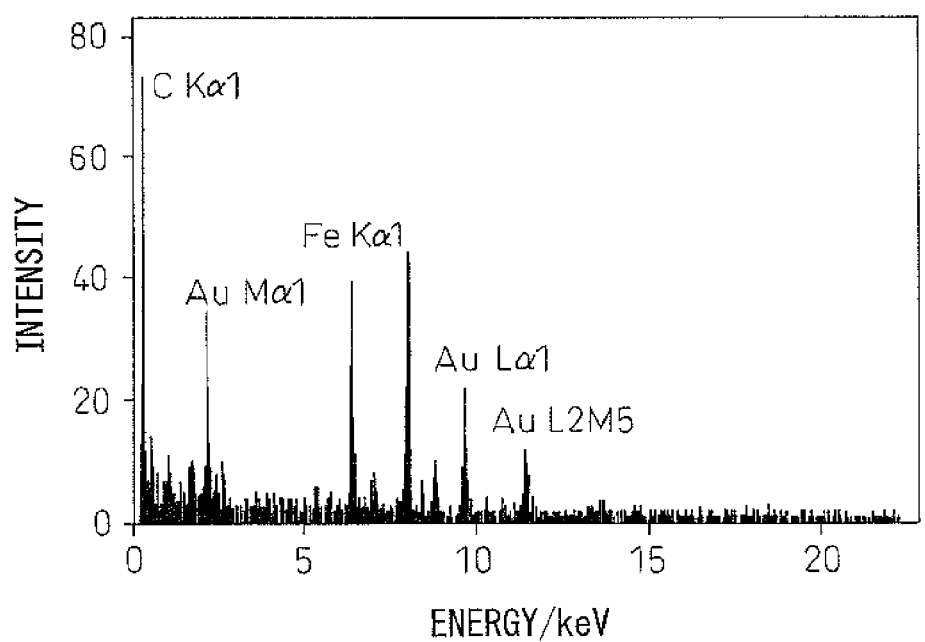
FIG. 9 is a TEM-EDS spectrum of AuFe (Au:Fe=50:50) nanoparticles of an AuFe/$SiO_2$-based $NO_x$ purification catalyst obtained in another example of the invention.

Referring to FIG. 9, it is shown that the $NO_x$ purification catalyst particles, according to the TEM-EDS spectrum, include both ingredients of gold and iron.

Figure 13:
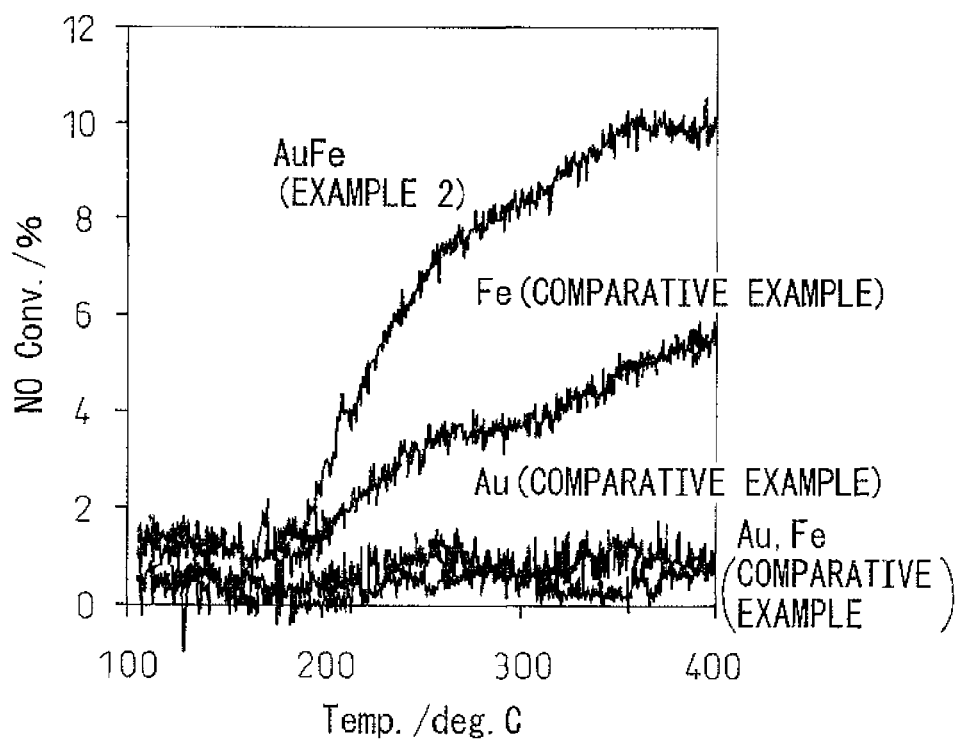
FIG. 13 is a graph comparing the NO—$H_2$ catalytic activity of an AuFe (Au:Fe=50:50)/$SiO_2$-based $NO_x$ purification catalyst obtained in another example of the invention and nanometallic $NO_x$ purification catalysts outside the range of the present invention.

Further, from FIG. 13, among the catalysts having $SiO_2$ as carriers, the AuFe (Au:Fe=50:50)/$SiO_2$-based $NO_x$ purification catalysts obtained in the examples of the invention have a higher NO—$H_2$ catalytic activity than $NO_x$ purification catalysts comprised of $SiO_2$ carriers on which iron alone or gold alone is carried, which are outside the scope of the present invention, in the 200 to 400° C. range.

Figure 5A:
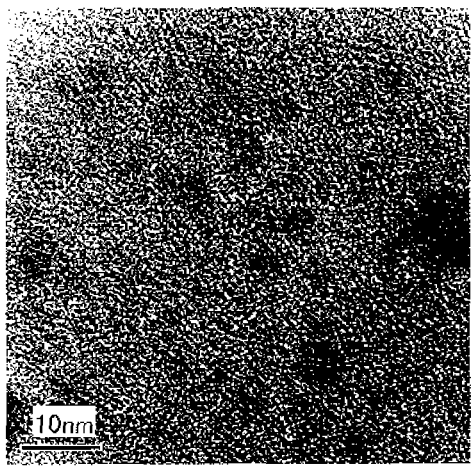
FIG. 5A is a TEM image of nanoparticles of AuFe (Au:Fe=25:75) of an AuFe/$SiO_2$-based $NO_x$ purification catalyst obtained in another example of the invention.
Figure 5B:
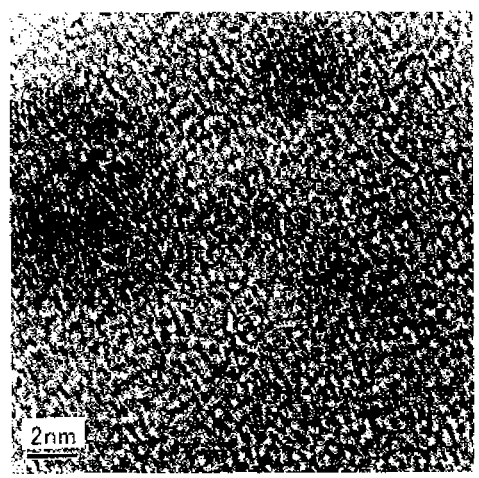
FIG. 5B is a TEM image changing the scale of FIG. 5A.

Referring to FIG. 5A and FIG. 5B, the AuFe (Au:Fe=25:75)/$SiO_2$-based $NO_x$ purification catalysts of the example are comprised of nanoparticles of AuFe of a mean particle size of 3.86±0.96 nm.

Figure 10:
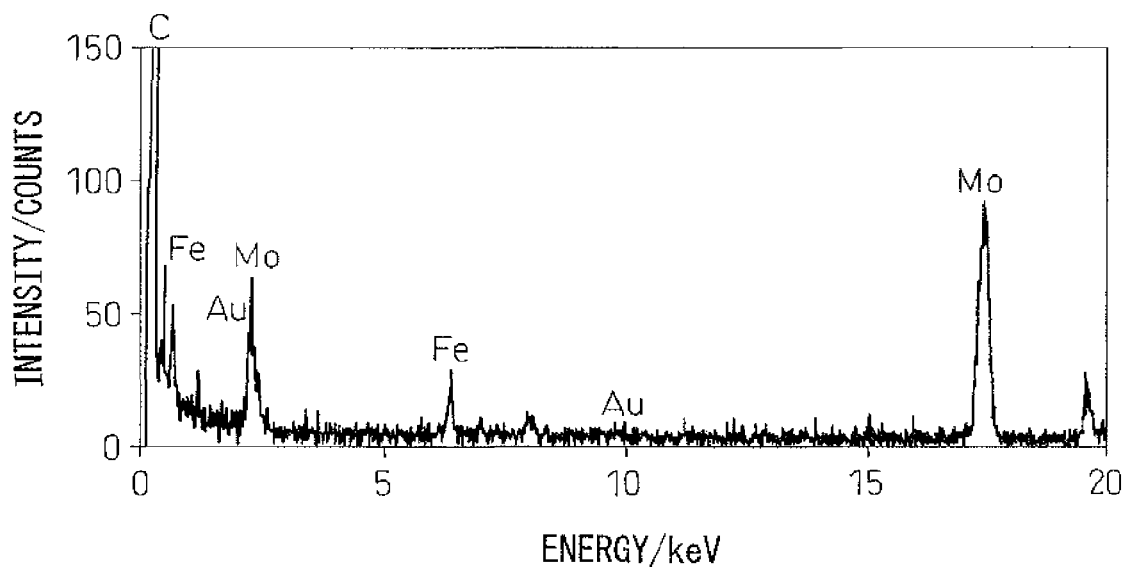
FIG. 10 is a TEM-EDS spectrum of AuFe (Au:Fe=25:75) nanoparticles of an AuFe/$SiO_2$-based $NO_x$ purification catalyst obtained in another example of the invention.

Referring to FIG. 10, the $NO_x$ purification catalyst particles include both the ingredients of gold and iron from the TEM-EDS spectrum.

Figure 11:
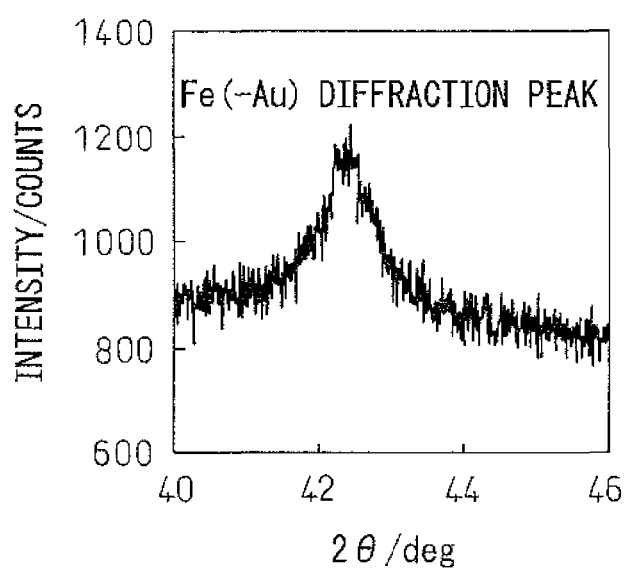
FIG. 11 is an X-ray diffraction spectrum of AuFe (Au:Fe=25:75) nanoparticles.

Referring to FIG. 11, the Fe(—Au) peak in the X-ray diffraction spectrum is broad. This shows that the Au—Fe particulate is amorphous.

Figure 14:
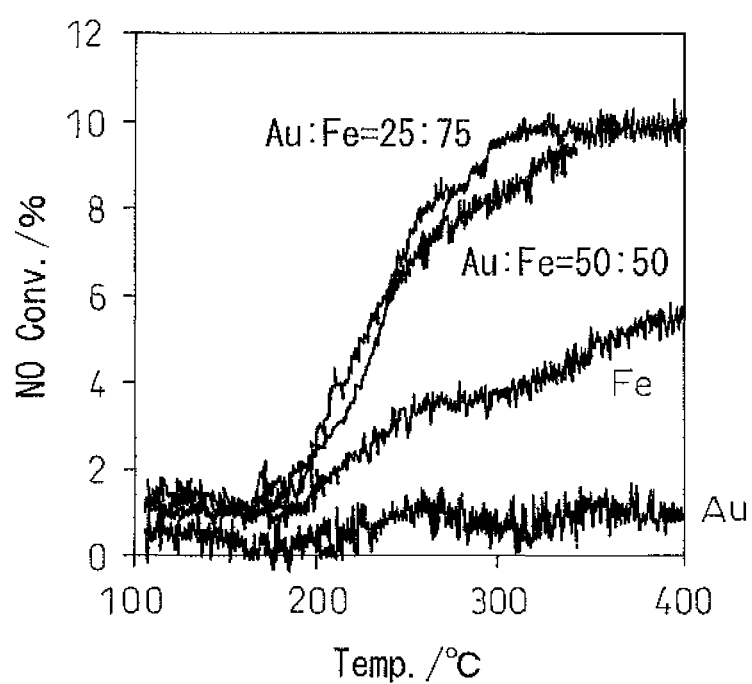
FIG. 14 is a graph showing the NO—$H_2$ catalytic activity of an AuFe (Au:Fe=25:75)/$SiO_2$-based $NO_x$ purification catalyst obtained in another example of the invention.

Further, from FIG. 14, the AuFe (Au:Fe=25:75)/$SiO_2$-based $NO_x$ purification catalyst reported as an example of the invention has a high NO—$H_2$ catalytic activity in the 200 to 400° C. range.

Figure 15:
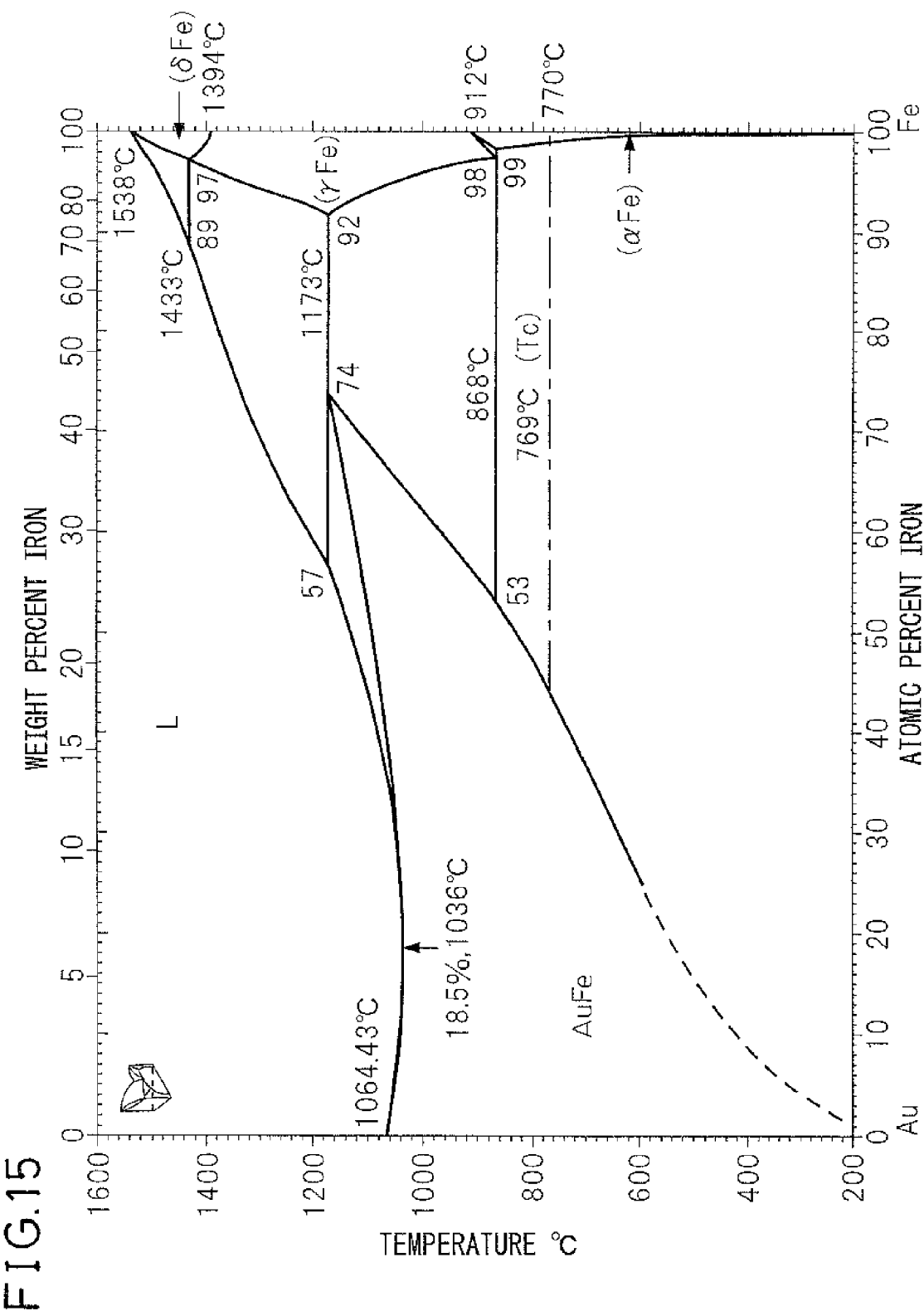
FIG. 15 is a phase diagram (calculated) of Au—Fe copied from Binary Alloy Phase Diagram, vol. 2, p. 259, 1984.

The $NO_x$ purification catalyst of the present invention, as explained above, is comprised of particles having an average particle size of 0.2 to 100 nm and including gold atoms and iron atoms in a state of close proximity. As shown in FIG. 15, the phase diagram for Au—Fe reveals that gold and iron cannot form a solid solution in the bulk or thin films for Au:Fe ratios of 8:92 to 26:74 (at %). That is, it is considered possible to form bimetallic nanoparticles with a range of compositions which cannot form a bimetal, to achieve compositions of Au:Fe in the range 7:93 to 91:9 (at %) and thereby obtain good $NO_x$ purification catalyst activity.

The $NO_x$ purification catalyst of the present invention has to have gold atoms and iron atoms present in a state of close proximity in nanoparticulates. For this reason, the region where the atoms are in close proximity may include other metal atoms able to alloy with the two atoms. Therefore, when it is necessary to use a carrier, the $NO_x$ purification catalyst of the present invention can be obtained by, for example, using nanoparticles of the material forming the carrier as cores for obtaining nanoparticles in which the two metals are in close proximity (that is, are alloyed).

As other metal atoms able to alloy with both the gold atoms and iron atoms, for example, tungsten (W), which can improve the heat resistance of Au by alloying, may be suggested.

Further, as the carrier, $Al_2O_3$, $SiO_2$, $CeO_2$, $CeO_2$—$ZrO_2$, and other metal oxides or carbon and silicon carbide may be mentioned.

The $NO_x$ purification catalysts of the present invention can be obtained by making the carrier support nanoparticles in which gold atoms and iron atoms are included in a state of close proximity.

The nanoparticles in which gold atoms and iron atoms are included in a state of close proximity can be obtained by, for example, reducing a mixture of gold salts and iron salts in the presence of a protective polymer material using a reducing agent, for example, a polyol or alcohol. The reduction reaction is performed in solution, preferably an aqueous solution, while under agitation.

At the end of the reduction reaction, the protective polymer material is separated and removed by, for example, centrifugal separation, solvent extraction, etc., and the obtained colloid in which the gold atoms and iron atoms are present in a state of close proximity is uniformly mixed with the carrier so as to ensure that the carrier supports the nanoparticles which include gold atoms and iron atoms in a state of close proximity.

The size of the AuFe particles with the gold atoms and iron atoms contained in a state of close proximity can be 0.2 to 100 nm, preferably 2 to 10 nm.

As the gold salts, aurochloric acid ($HAuCl_4$), sodium tetrachloroaurate, potassium tetrachloroaurate, gold trisodium disulfite, potassium trisodium disulfite, etc. may be mentioned.

As the iron salts, for example, iron sulfate, iron nitrate, iron chloride, iron bromide, iron acetate, iron hydroxide, etc. may be mentioned.

As the reducing polyol, ethylene glycol, diethylene glycol, triethylene glycol, tetraethylene glycol, 1,2-propanediol, dipropylene glycol, 1,2-butanediol, 1,3-butanediol, 1,4-butanediol, 2,3-butanediol, 1,5-pentanediol, polyethylene glycol, etc. may be mentioned. To complete the reduction of the gold ions and nickel ions, at the final stage of reduction, for example, boron dimethylamide, boron diethylamide, sodium borohydrate, borane, or another boron compound can be added as a reducing agent. As the protective polymer material, poly-N-vinylpyrrolidone(PVP), polyacrylamide, polyvinylpiridine, poly-n-vinylpyridine(PVPn), N-vinylpyrrolidone and acrylic acid copolymer, polyvinylmethylketone, poly(4-vinylphenol), oxazoline polymer, polyalkylene imine, and other polymers containing functional groups may be mentioned.

The $NO_x$ purification catalyst of the present invention is preferably composed of particles mainly comprised of Au and Fe wherein the composition of Au and Fe in the particles is Au:Fe=7:93 to 91:9 (at %). If the composition of Au and Fe in the particles is outside this range, alloy formation and the residence of gold atoms and iron atoms in a state of close proximity is difficult, interaction of gold atoms and iron atoms is not obtained, and the $NO_x$ purification performance tends to drop. In particular, even with an Au:Fe=8:92 to 26:74 (at %) ratio of composition, where alloying was believed to be difficult in conventional thin films, the formation of nanoparticles enables to take place.

The $NO_x$ purification catalyst that constitutes the present invention combines Au and Fe in close proximity and demonstrates a superior $NO_x$ purification performance. This performance cannot be matched using Au or Fe in gredients singly. In particular, the present invention demonstrates superior catalytic activity in $NO_x$ purification compared even to other alloys and Rh or other single precious metal particles.

In contrast to previous catalysts, for the $NO_x$ purification catalyst that constitutes the present invention, the temperature required to raise the $NO_x$ purification activity to a significant level does not need to be high. Even in an oxidizing atmosphere, the present invention has an $NO_x$ purification ability, so the use of fuel for making the atmosphere a reducing atmosphere becomes unnecessary or can be greatly reduced. Further, according to the $NO_x$ purification catalyst that constitutes the present invention, there is no need to lower the air-fuel ratio (A/F) in the engine. For example, during steady-state operation at a high air-fuel ratio (for example, stoichiometric, where A/F=14.7), a gasoline engine can exhibit an A/F≥20, while for a diesel engine an A/F≥30 is possible.

EXAMPLES

Below, examples of the present invention will be shown. The obtained catalysts were evaluated by the measurement methods shown below. The measurement methods shown below are illustrative. The invention is not limited to these.
1. Measurement of Alloy Composition of Catalyst
   Measurement method: Measurement of composition of bulk as a whole by XRD (X-ray diffraction)
   Measurement apparatus: PHILIPS X'Pert MRD
2. Measurement of Particle Shape and Particle Distribution of Alloy Nanoparticles
   Measurement method 1: Measurement by TEM (transmission electron microscope)
   TEM measurement apparatus: HITACHI HD-2000 STEM
   Measurement method 2: HRTEM (high resolution transmission electron microscope)
   HRTEM measurement apparatus: HITACHI HD-2000
3. Measurement by Elementary Analysis of Alloy Nanoparticles
   Measurement method: Measurement of composition by TEM-EDS (EDS: energy dispersive X-ray spectroscopy)
   TEM-EDS measurement apparatus: HITACHI HD-2000 STEM
4. Measurement of Catalytic Activity
   Catalyst pellets were packed into a glass reaction tube and anchored by glass wool. A gas composed of 1000 ppm of NO and 1000 ppm of $H_2$ or CO and $N_2$ mixed in advance by balanced flow rates was run through the glass reaction tube. The gas temperature was raised at a temperature elevation rate of 20° C./min from 100° C. to 500° C. or 400° C. The NO concentration was measured by an exhaust gas analyzer (HORIBA MEXA7100H) or MS (mass spectrometry). Note that, when running a hot gas that does not include $H_2$, the measurement was conducted at 500° C. after hydrogen reduction.
5. X-Ray Diffraction of AuFe Particulates
   X-ray diffraction measurement apparatus: Rigaku RINT2000

Example 1

1) Synthesis of AuFe Nanoparticles

In a two-necked flask, 1.1 g of poly-n-vinylpyrrolidone (PVP) or poly-n-vinylpyridine(PVPn) was added to 120 ml of anhydrous ethylene glycol. Into this mixture, 0.0574 g of iron sulfate monohydrate ($FeSo_4$(II). $H_2O$) was added. The mixture was agitated at 80° C. for 3 hours to obtain a solution (solution 1).

Separately, in a two-necked flask, 0.1809 g of $NaAuCl_4$ was added to 40 ml of distilled water. The mixture was strongly agitated for 2 hours or more to cause dissolution and obtain a bright orange colored solution (solution 2).

The solution 1 was cooled to 0° C. Solution 2 was poured into solution 1 and the two were uniformly agitated. The mixed solution was adjusted by a 1M NaOH solution (about 7 ml) to give a pH of 9 to 10. The mixed solution was heated in an oil bath to 100° C. and was held there for 2 hours while being agitated. After this, the flask was removed from the oil bath and allowed to stand until the colloidal suspension had cooled to room temperature. To completely reduce all of the ions in the flask, sodium borohydride 0.038 g was added, then the suspension was allowed to stand for while stirring the mixture.

The produced nanoparticles were refined by treating a certain fraction including a predetermined amount of nanoparticles with a large amount of acetone. This caused the PVP (or PVPn) to be extracted to the acetone phase, and the metal nanoparticles to coagulate. The supernatant was transferred (decanted) or centrifuged to obtain the colloid. The acetone phase was removed, then the refined colloid was dispersed in pure ethanol by gentle stirring.

2) Support of AuFe Nanoparticles on a Carrier

In a 100 ml Schlenk flask, 1 g of the carrier (for example $Al_2O_3$) was inserted. The inside of the Schlenk flask was evacuated, then $N_2$ was run into it to clean the piping and completely remove the air. The concentration of the suspension of the colloid previously synthesized (both the refined colloid and remaining solution) was determined in advance, and a refined colloidal suspension containing Rh0.5 wt % molar equivalents of Au and Fe metal was injected through a rubber septum into the Schlenk flask. The mixture was agitated at room temperature for 3 hours, then the solvent was removed in vacuo. After this, the remaining polymer protective material of the colloidal precipitate was removed and the result dried at 200 to 1000° C. by heating under vacuum, air or $H_2$ atmosphere. The obtained catalyst powder was pressed to obtain pellets of approximately 2 mm size.

3) Evaluation of Catalyst

The obtained AuFe (50:50)/$Al_2O_3$ catalyst was measured for shape and particle size distribution of the bimetal particles.

A TEM image is shown in FIG. 3A, a TEM image changed in scale is shown in FIG. 3B, and a histogram representing size of the nanoparticles and showing the size distribution of 100 particles in HRTEM image is shown in FIG. 6. The size of the nanoparticles was 4.97±0.75 nm.

Further, the TEM-EDS spectrum of the nanoparticles of the AuFe (50:50) is shown in FIG. 8. From FIG. 8, it is shown that all individual particles include Au and Fe.

Furthermore, the obtained AuFe (50:50)/$Al_2O_3$ catalyst was measured for NO—CO catalytic activity under the following gas flow conditions.

Gas flow conditions

Gas composition NO 1000 ppm, CO 1000 ppm, $N_2$ bal/10 liters

Flow rate: 500 ml/min

Pellets: 150 mg

Space velocity: 3.3 liters/min·g

Au, Fe base metal concentrations: each 0.0486 mmol/g-cat

The results are shown together with other results in FIG. 12.

Comparative Example 1

Except for not using the solution 1, the same procedure was followed as in Example 1 to obtain an Au/Al$_2$O$_3$ catalyst.

The obtained Au/Al$_2$O$_3$ catalyst was measured for NO—CO catalytic activity in the same way as Example 1. The results are shown together with other results in FIG. 12.

Comparative Examples 2 to 4

Except for replacing the iron sulfate in Example 1 with tungsten chloride (Comparative Example 2), rhenium chloride (Comparative Example 3), or manganese oxide (Comparative Example 4), the same procedure was followed as in Example 1 to obtain a AuW (50:50)/Al$_2$O$_3$ catalyst, AuRe (50:50)/Al$_2$O$_3$ catalyst, and AuMn (50:50)/Al$_2$O$_3$ catalyst.

The obtained catalysts were measured for NO—CO catalytic activity in the same way as Example 1. The results are shown in FIG. 12 together with the results of the catalyst of Example 1.

Example 2

Except for changing the carrier from Al$_2$O$_3$ to SiO$_2$, the same procedure was followed as in Example 1 to obtain an AuFe (50:50)/SiO$_2$ catalyst.

The obtained AuFe (50:50)/SiO$_2$ catalyst was measured for the shape and particle size distribution of the bimetal particles.

Figure 4A:
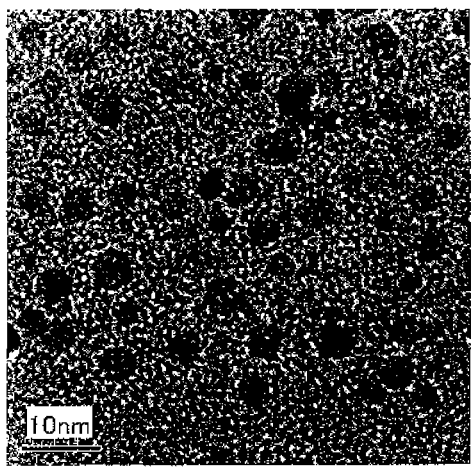
FIG. 4A is a TEM image of nanoparticles of AuFe (Au:Fe=50:50) of an AuFe/$SiO_2$-based $NO_x$ purification catalyst obtained in another example of the invention.
Figure 4B:
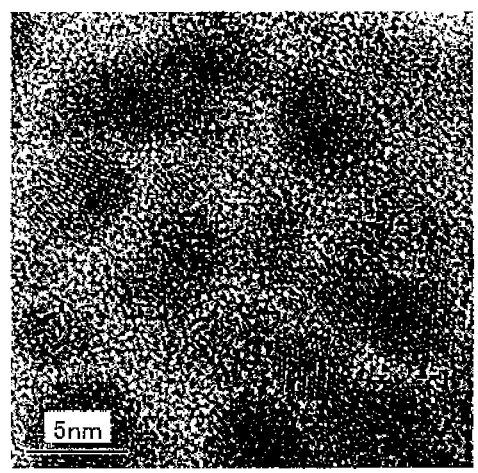
FIG. 4B is a TEM image changing the scale of FIG. 4A.

A TEM image is shown in FIG. 4A and a TEM image changed in scale is shown in FIG. 4B. The size of the nanoparticles was 3.94±0.56 nm. Further, the TEM-EDS spectrum measured for AuFe (Au:Fe=50:50) colloid on a Cu covered grid is shown in FIG. 9. From FIG. 9, it is shown that all individual particles include Au and Fe.

Figure 4C:
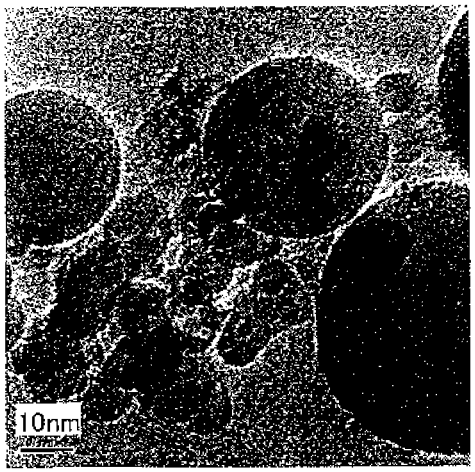
FIG. 4C is a TEM image of nanoparticles of AuFe (Au:Fe=50:50) of an AuFe/$SiO_2$-based $NO_x$ purification catalyst obtained in another example of the invention.
Figure 4D:
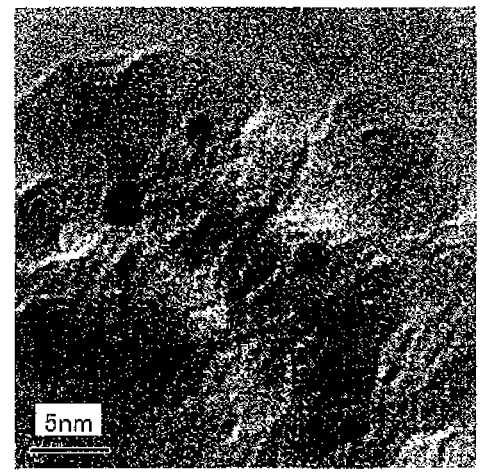
FIG. 4D is a TEM image changing the scale of FIG. 4C.

Further, for the results of an experiment run similarly to examine reproducibility, a TEM image is shown in FIG. 4C, a TEM image changed in scale is shown in FIG. 4D, and a distribution histogram of the nanoparticle size showing the particle size distribution of 100 particles in a measured HRTEM images is shown in FIG. 7. The mean size of the nanoparticles was 4.72±0.77 nm.

Furthermore, the obtained AuFe (50:50)/SiO$_2$ catalyst was measured for NO—H$_2$ catalytic activity under the following gas flow conditions.

Gas flow conditions

Gas composition: NO 1000 ppm, H$_2$ 1000 ppm, N$_2$ bal/10 liters

Flow rate: 10 liters/min, pellets: 2 g

Space velocity: 5 liters/min-g

Au, Fe base metal concentrations: Each 0.0486 mmol/g-cat

The obtained results are shown together with the other results in FIG. 13 and FIG. 14.

Comparative Example 5

Except for changing the carrier from Al$_2$O$_3$ to SiO$_2$, the same procedure was followed as in Comparative Example 1 to obtain an Au/SiO$_2$ catalyst.

The obtained catalyst was measured for NO—H$_2$ catalytic activity in the same way as Example 2. The results are shown together with the other results in FIG. 13.

Comparative Example 6

The same amount of iron acetate as in Example 2 was dissolved in 100 ml of water. In a separate flask, 50 g of carrier (SiO$_2$) was added to 200 ml of water while agitating to obtain a colloid suspension. The iron acetate aqueous solution was poured into this and the result was allowed to stand for 2 hours. After this, the moisture was allowed to evaporate at 70 to 90° C., then the sample was dried at 120° C. for 15 hours and was fired at 500° C. for 2 hours. The obtained catalyst powder was pressed to obtain approximately 2 mm pellets of Fe/SiO$_2$ catalyst.

The obtained catalyst was measured for NO—H$_2$ catalytic activity in the same way as Example 2. The results are shown together with the other results in FIG. 13.

Comparative Examples 7 to 8

Using equimolar amounts of iron acetate and aurochloric acid, the same procedure was followed as in Comparative Example 6 to evaporate a mixed metal ion solution of gold and iron in order to cause precipitation of metal and thereby obtain an Au,Fe/Al$_2$O$_3$ catalyst (Comparative Example 7) and Au,Fe/SiO$_2$ catalyst (Comparative Example 8).

The obtained catalysts were measured for catalytic activity in the same way as Example 2. The results are shown together with the other results in FIG. 13.

Example 3

Except for changing the ratio of gold and iron from AuFe=50:50 to Au:Fe=25:75, the same procedure was followed as in Example 2 to obtain an AuFe (25:75)/SiO$_2$ catalyst.

A TEM image is shown in FIG. 5A and a TEM image changed in scale is shown in FIG. 5B. The mean size of the nanoparticles was 3.86±0.96 nm.

Further, the TEM-EDS spectrum measured for AuFe (Au:Fe=25:75) colloid on a molybdenum covered grid is shown in FIG. 10. From FIG. 10, it is shown that all individual particles include gold and iron.

For one nanoparticle of this catalyst, the following semi-quantitative values of ratios of concentration were obtained by calculation from the intensity ratios of the TEM-EDS;

| Element | Intensity | Weight % | Atomic % |
|---------|-----------|----------|----------|
| Fe K    | 4.22      | 56.6     | 82.1     |
| Au L    | 0.68      | 43.4     | 17.9     |

The results show that for a nominal metal ratio (according to the synthetic protocol) of Au:Fe=25:75 (therefore, the average value of nanoparticles as well), nanoparticle exhibits an Au:Fe of 17.9:82.1.

Further, the X-ray diffraction pattern of the Au—Fe particulate was measured. The results are shown in FIG. 11. From FIG. 11, since the particulate was amorphous, the Fe(—Au) peak was broad and the peak height was 204 counts, the half value was 0.815 deg, and the half value/peak height was 4.0E-3 deg/counts. Note that the Au (111) diffraction peak was 38 deg, while the Fe (111) diffraction peak was 44 deg.

Furthermore, the obtained AuFe (25:75)/SiO$_2$ catalyst was measured for NO—H$_2$ catalytic activity in the same way as in Example 2.

The results are shown in FIG. 14.

The results of FIG. 13, FIG. 14, and FIG. 15 show that the NO$_x$ purification catalyst that constitutes the present invention has excellent NO$_x$ purification performance at a low temperature and/or in an oxidizing atmosphere.

According to the $NO_x$ purification catalyst that constitutes the present invention, from the viewpoint of resource depletion, gold can be alloyed with iron, which is present in large quantities on the earth, over a broad ratio of compositions in a state whereby the different atoms reside in close. The temperature required to raise the $NO_x$ purification activity does not have to be as high as has been the case in the past. Furthermore, $NO_x$ purification activity is even observed in an oxidizing atmosphere, so the use of fuel for making the atmosphere a reducing state one becomes unnecessary or at least can be greatly decreased. There is no need, when operating under steady-state conditions, to make the air-fuel ratio (A/F) close to stoichiometric (A/F=14.7). Operation at a high air-fuel ratio of, for example, theoratically, in the case of a gasoline, an A/F=20, and in the case of a diesel engine, an A/F=30, is possible.

While the invention has been described with reference to specific embodiments chosen for the purpose of illustration, it should be apparent that numerous modifications could be made thereto by those skilled in the art without departing from the basic concept and scope of the invention.

The invention claimed is:

1. A nitrogen oxide purification catalyst, comprising:
    alloy particles having an average particle size of 0.2 to 100 nm and consisting of gold atoms, iron atoms and optionally other metal atoms that are able to alloy with said Au atoms and Fe atoms, in a state of close proximity; and
    a metal oxide carrier selected from $Al_2O_3$, $SiO_2$, $CeO_2$ and $CeO_2$—$ZrO_2$,
    wherein said alloy particles are supported on said metal oxide carrier.

2. A catalyst as set forth in claim 1, wherein the composition ratio of said Au and Fe is Au:Fe=7:93 to 91:9 (at %).

3. A catalyst as set forth in claim 1, wherein the composition ratio of said Au and Fe is Au:Fe=8:92 to 26:74 (at %).

4. A catalyst as set forth in claim 1, wherein said average particle size is 0.2 to 30 nm.

5. A catalyst as set forth in claim 1, wherein said other metal atoms are not present in the alloy particles.

6. A catalyst as set forth in claim 1, wherein the alloy particles consist of Au atoms, Fe atoms and W atoms.

* * * * *